United States Patent [19]

Del Rosario

[11] Patent Number: 5,197,309

[45] Date of Patent: Mar. 30, 1993

[54] VEHICLE LOCK WITH FLEXIBLE CABLE

[76] Inventor: Luis Del Rosario, 4524 Brazil St., Los Angeles, Calif. 90039

[21] Appl. No.: 719,225

[22] Filed: Jun. 20, 1991

[51] Int. Cl.⁵ .............................................. B60R 25/02
[52] U.S. Cl. ........................................ 70/209; 70/226; 70/239; 70/279
[58] Field of Search ................................ 70/237-239, 70/257, 225, 226, 209-212, 254, 255, 201-203, 277, 279, 282

[56] References Cited

U.S. PATENT DOCUMENTS

| | | | |
|---|---|---|---|
| 1,193,679 | 8/1916 | Fox | 70/238 X |
| 1,368,922 | 2/1921 | Gerfers | 70/212 |
| 1,430,463 | 9/1922 | Newton | 70/211 |
| 1,466,537 | 8/1923 | McCarthy | 70/210 |
| 1,483,687 | 2/1924 | Shepard | 70/18 |
| 1,972,300 | 9/1934 | Hemingway, Jr. | 70/254 |
| 2,964,935 | 12/1960 | Lombardi | 70/282 |
| 4,825,671 | 5/1989 | Wu | 70/202 X |
| 4,949,559 | 8/1990 | Glines | 70/19 |

FOREIGN PATENT DOCUMENTS

| | | | |
|---|---|---|---|
| 0399958 | 11/1990 | European Pat. Off. | 70/16 |
| 912309 | 8/1946 | France | 70/238 |
| WO90/09911 | 9/1990 | PCT Int'l Appl. | 70/226 |

*Primary Examiner*—Lloyd A. Gall
*Attorney, Agent, or Firm*—Wagner & Middlebrook

[57] ABSTRACT

A locking device for motor vehicles includes a clamp device including a pair of jaws secured to the steering wheel rim of the vehicle, an anchor secured to the body of the vehicle and a heavy but somewhat flexible cable securing the clamp device to the anchor. The clamp device, when locked, is opened by means of a key lock mechanism or a solenoid operated from a switch. The switch may be operated manually or through an electronic control such as an alarm system.

5 Claims, 3 Drawing Sheets

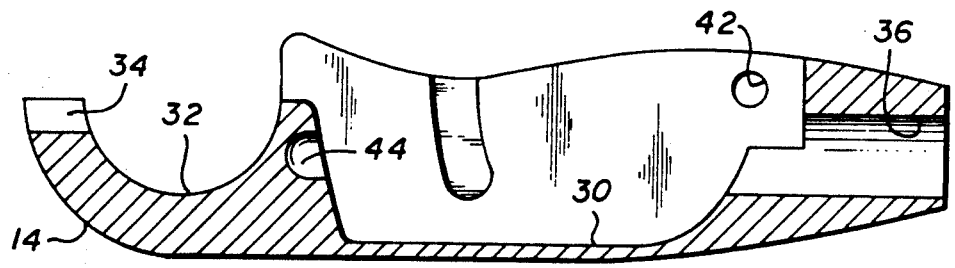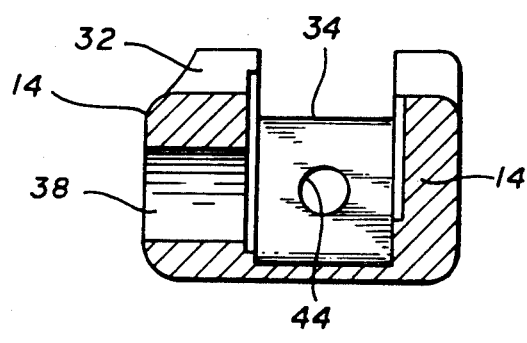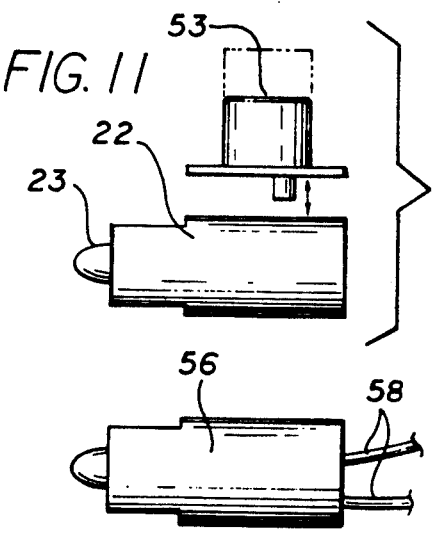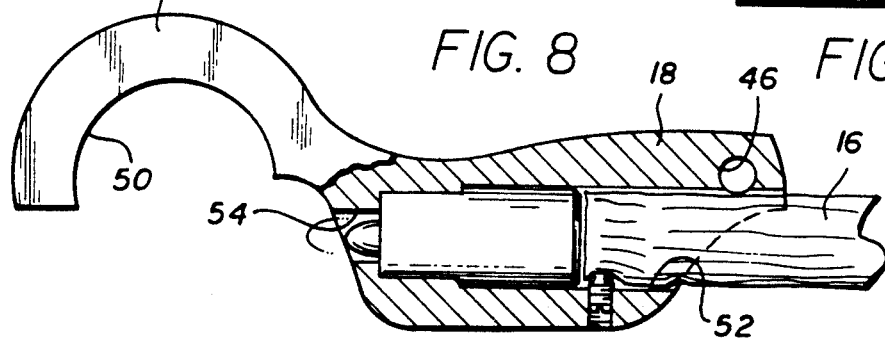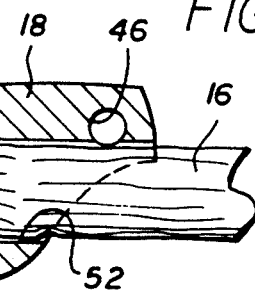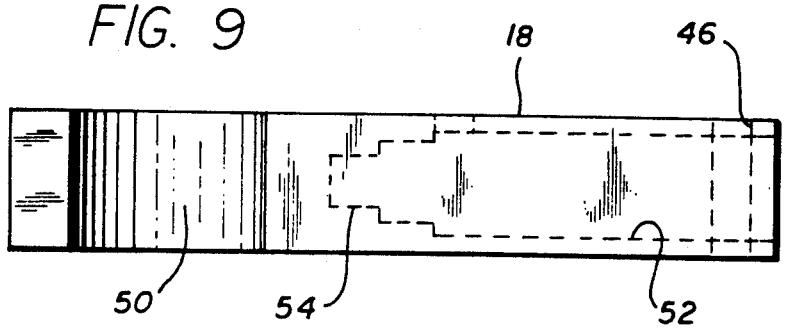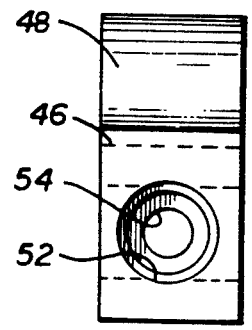

VEHICLE LOCK WITH FLEXIBLE CABLE

BACKGROUND OF THE INVENTION

This invention is related to locking devices for motor vehicles and more particularly to a device for limiting movement of the steering wheel such that unauthorized drivers cannot operate the vehicle.

Although manufacturers have done much to inhibit theft of automobiles such as by making entry more difficult by door and window design, by making locks harder to defeat while at the same time incorporating hood latches operable only from inside the cabin, and by locking the steering wheel with the ignition lock, nevertheless, skilled thieves still succeed in defeating these measures.

Various after-market devices have also been only partially successful in inhibiting such thievery. Considerable sums are spent by automobile owners to install any of several types of auto alarm devices which respond to attempts to enter the car in a number of ways such as flashing the headlights, blowing the horn or operating a separate alarm such as a siren. Sophisticated car thieves often learn to disable such electronic devices. Another comparatively inexpensive device which has had some success consists essentially in a relatively long and sturdy bar which is locked to the steering wheel and which inhibits steering because it interferes with other solid parts of the car such as a door or windshield or which is attached at its opposite end to a brake pedal. Part of the purpose of such a device is to deter attempts at theft simply because it is very visible from outside and presents an obvious problem to a would-be thief. It is also somewhat unattractive in appearance and awkward to put on, take off and store. It is believed that there is a need for a device which will inhibit operation of the steering wheel in much the same way but which is significantly less unattractive in appearance and is more convenient to operate and to store while the vehicle is being operated.

BRIEF DESCRIPTION OF THE INVENTION

Applicant has devised a steering wheel locking mechanism which is believed to be essentially as effective as the bar described above as a deterrent, which is as effective in preventing movement of the steering wheel and which is more attractive in appearance and considerably easier to operate and to store. The device consists essentially in a clamp device for clamping to the steering wheel rim, a heavy, armored cable fastened to the clamp device and an anchor, also fastened to the cable and firmly attached to the vehicle body such as to the firewall behind the dashboard or to the floor. A lock in the clamp device which may be operated by a key provides a means for releasing the clamp from the steering wheel rim. Alternatively, the clamp device may include a solenoid-operated latch operated by the owner or authorized driver to release the clamp. The solenoid may be operated from a simple concealed switch or it may be connected to operate through an electronic alarm system, in which case it may be released by operation of a remote control at the same time the alarm system is disabled. The armored cable is just long enough to enable the clamp device to be easily attached to the steering wheel. With such length, the steering wheel will be limited in movement to no more than about a quarter turn. Storage is easily effected, preferably by hanging the clamp device on a bracket in the dashboard area or along the side of a center console.

BRIEF DESCRIPTION OF THE DRAWING

This invention may be more clearly understood from the following detailed description and by reference to the drawings in which:

FIG. 6 is a sectional view taken along line 6—6 of FIG. 5;

FIG. 7 is a sectional view taken along line 7—7 of FIG. 5;

FIG. 8 is a side elevation, partly in phantom, of the mating jaw portion of the locking mechanism of FIGS. 1, 2 and 3;

FIG. 9 is a bottom view of the jaw portion of FIG. 8;

FIG. 10 is a view of the jaw portion of FIG. 8 as seen from the right end;

FIG. 11 is a side elevational view of a key lock mechanism usable with the locking mechanism described in relation to FIGS. 1-10; and FIG. 12 is a side elevational view of a solenoid latch mechanism usable with the locking mechanism described in relation to FIGS. 1-10.

DETAILED DESCRIPTION OF THE INVENTION

Figure 1:
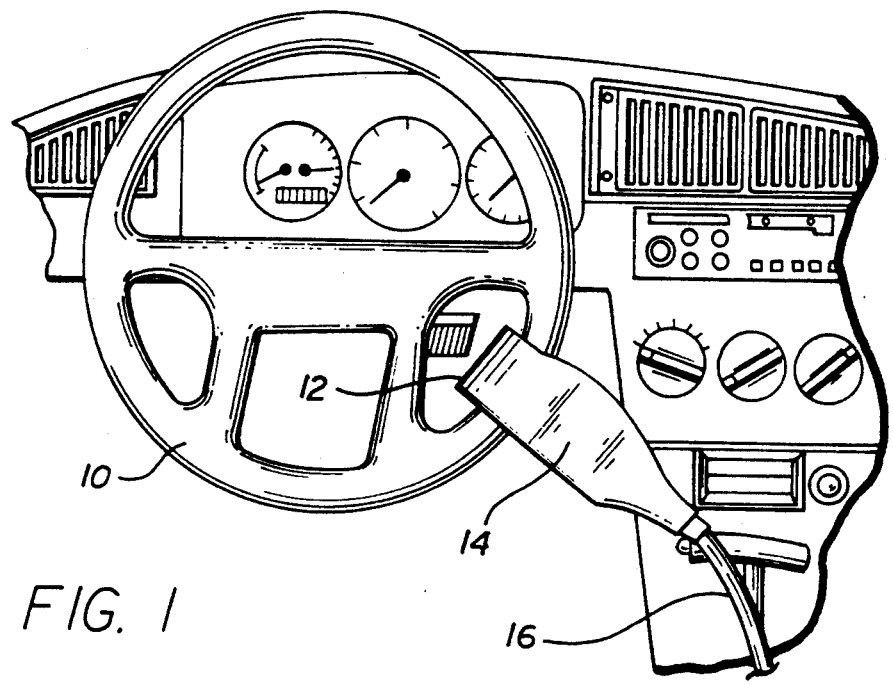
FIG. 1 is a front elevational view of a locking mechanism according to my invention attached to a steering wheel of an automobile.
Figure 2:
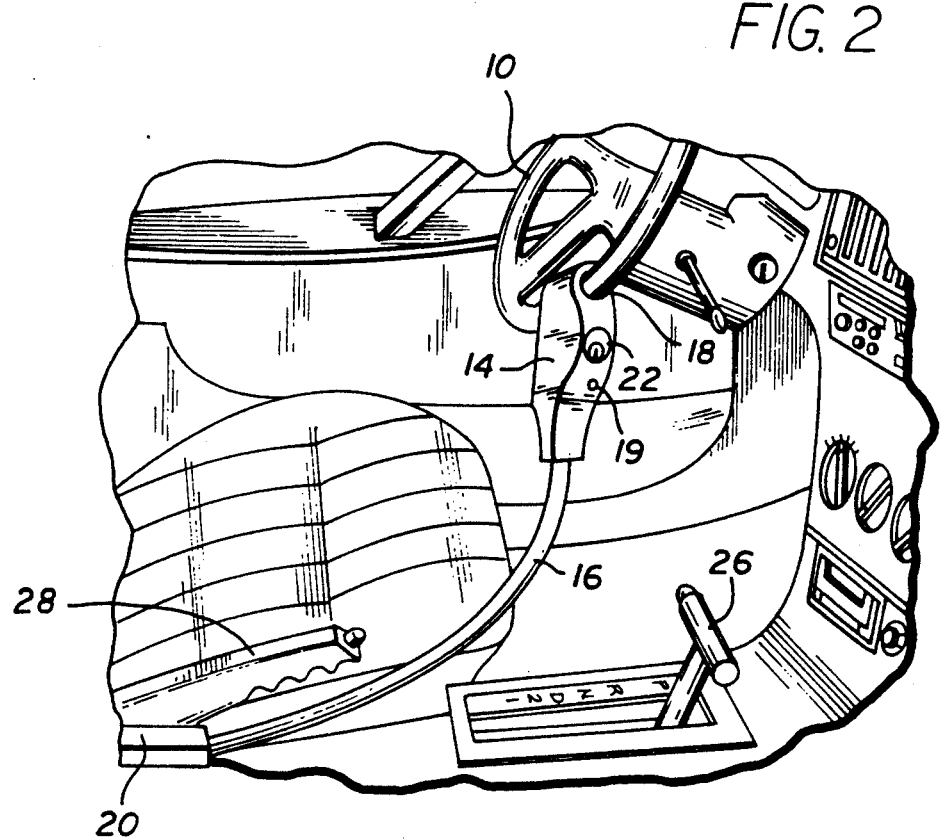
FIG. 2 is a view from the side of the locking mechanism of FIG. 1.

Referring now to FIG. 1, a typical automobile steering wheel is shown at numeral 10 having attached thereto a locking device 12 according to my invention. Visible in this view is the head and jaw member 14 which is secured to a strong and heavy, but somewhat flexible armored cable 16 preferably covered with a non-reflective plastic jacket. FIG. 2 is a view of the steering wheel 10 and locking device 12 from the side showing the head and jaw member 14 and a portion of the mating jaw member 18 clamped on the rim of the steering wheel 10. Cable 16, in the installation shown, is attached to an anchor member 20 firmly attached to the floor of the automobile. To inhibit attempts to pull the cable loose from the anchor 20 or the device 12 the cable is preferably threaded into anchor 20 or device 12 and further secured by means of a set screw having an Allen head covered with epoxy. Other suitable means might be employed to make it extremely difficult to pull the cable 16 loose, which will occur to those skilled in the art. Anchor member 20 may, in some installations, preferably be attached to the firewall of the vehicle.

Figure 3:
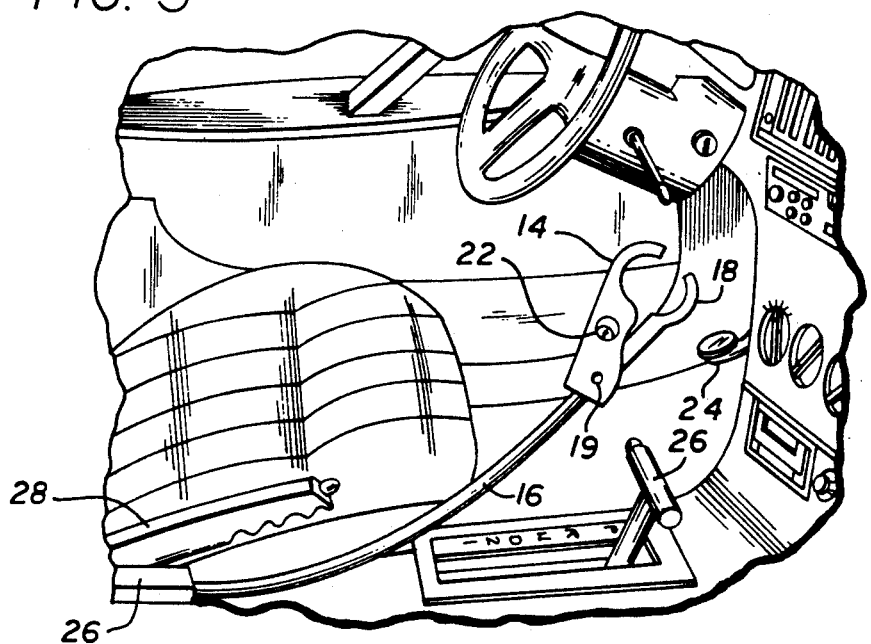
FIG. 3 is a view from the side of the locking mechanism of FIGS. 1 and 2 showing the mechanism unlocked and removed from the steering wheel.

FIG. 3 is a view similar to FIG. 2 but with the locking device 12 shown open and unattached to the steering wheel. In this view the mating jaw member 18 is shown open and pivoted around a pin 19 away from the head and jaw member 14 which carries a key lock 22 operative to unlock the locking device 12. Preferably the locking device 12 need only be snapped in place over the rim of the steering wheel 10 and need not be locked with a key. In this view a bracket 24 is shown attached to the automobile console for parking the locking device 12 when not in use. A similar bracket may be attached to the automobile dashboard, if desired. The cable 16 should be as short as possible consistent with reaching the o steering wheel 10 and the bracket 24. When parked in bracket 24, the cable should be carried in a position which will not interfere with operation of any of the controls such as the gear shift selector 26 or the parking brake handle 28.

Figure 4:
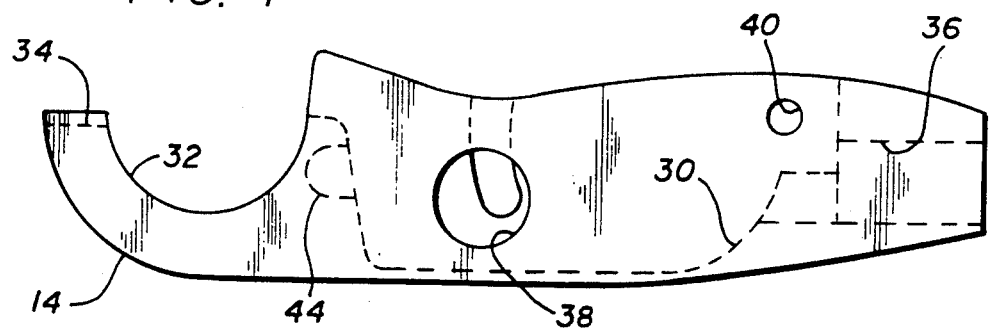
FIG. 4 is a side elevation, partly in phantom, of the head and jaw portion of the locking mechanism of FIGS. 1, 2 and 3.
Figure 5:
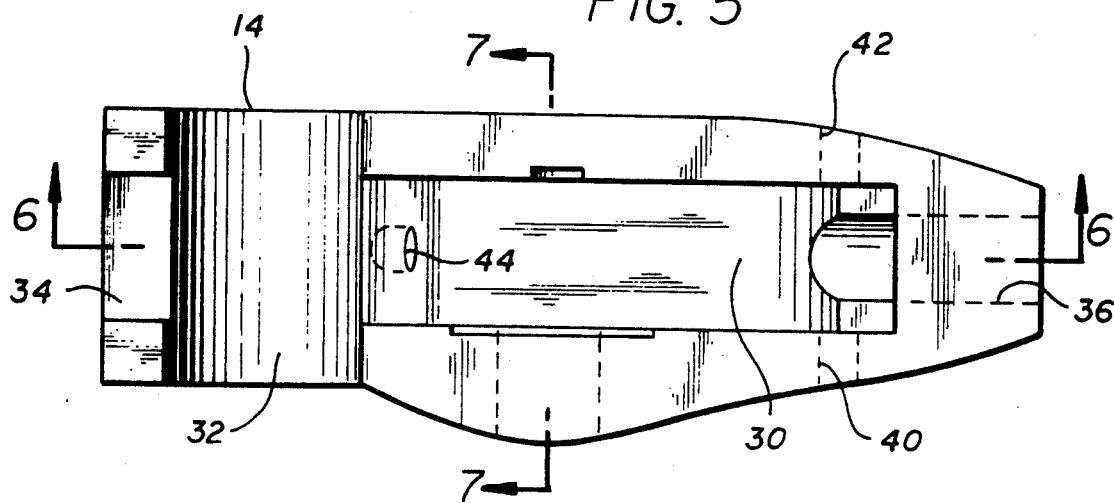
FIG. 5 is a view from the top, of the head and jaw portion of the locking mechanism shown in FIG. 4.

FIGS. 4 and 5 are a side and a top view, respectively, of the head and jaw member 14 including a large slot 30 for receiving the mating jaw member 18. A large opening 32 cooperates with mating jaw member 18 to constrain the rim of steering wheel 10. The outboard end of member 14 includes a rectangular notch 34 which receives a mating projection on the outboard end of member 18. A cylindrical opening 36 in the opposite end of member 14 receives one end of cable 16. A lateral opening 38 accessing slot 30 and, hence, mating jaw member 18, receives a key actuating part of lock mechanism 22 which holds the head and jaw member 14 and mating jaw member 18 together around the rim of steering wheel 10. A pair of smaller aligned lateral bores 40,42 at the attachment end of said jaw member 14 retain a pin 19 (See FIG. 3) around which mating jaw member 18 rotates. Because of the stiffness of cable 16, removal of pin 19 will not enable one to open the jaws; however, the pin is preferably secured by either putting it into a blind hole with the visible end covered with epoxy, or by using a rivet having a round head and upsetting the opposite end such that it cannot readily be withdrawn.

FIG. 6 is a sectional view taken along line 6—6 of FIG. 5. This view shows slot 30 and opening 32, notch 34, and cylindrical opening 36. Lateral bore 42 is also shown. Each of FIGS. 4, 5 and 6 show a bore 44 for receiving a latch or plunger to lock mating jaw 18 to the head and jaw member 14. This member is preferably of cast aluminum although other materials having substantial strength could be used.

FIG. 7 is a sectional view taken along line 7—7 of FIG. 5. In this view part of the end of opening 32 appears as well as notch 34. The bore 44 is shown as well as the opening 38 for receiving the latch or plunger referred to above.

FIG. 8 is a side elevational view of the mating jaw member 18, also of cast aluminum and FIGS. 9 and 10 are bottom and end views, respectively, of member 18. A bore 46 adapted to be aligned with bores 40 and 42 receives pin 19 (FIGS. 2 and 3) extending through the width of head and jaw member 14 and providing a pivotal attaching means for attaching mating jaw member 18 to head and jaw member 14. Member 18 includes a large arcuate portion 48 containing opening 50 which cooperates with opening 32 of member 14 to lock on the steering wheel rim 10. The end of arcuate portion 48 seats in notch 34. Extending longitudinally through member 18 is a bore 52 Which is aligned With bore 36 of member 14 and which receives tubular lock plunger mechanism 22 (FIG. 11) operated from a key inserted into the lock plunger 53 at opening 38. Lock mechanism 22 includes an axially movable latch 23 which moves through a smaller diameter extension 54 of bore 52 and into bore 44 of member 14 to lock the jaws together around the steering wheel rim 10.

Alternatively, the lock mechanism may include a solenoid 56 (FIG. 12) which is electrically actuated by conductors 58 carried through armored cable 16 and which also moves an axially movable latch carried on its armature. In this embodiment, the solenoid should preferably include a spring biasing the latch in the closed or locked position. Energizing of the solenoid through a switch or a command to an integrated electronic alarm system then operates to release the latch and open the jaws.

The above described embodiments of the present invention are merely descriptive of its principles and are not to be considered limiting. The scope of the present invention instead shall be determined from the scope of the following claims including their equivalents.

What is claimed is:

1. A locking device for locking the steering wheel of a motor vehicle comprising:

a clamp device including a head member having an outboard end and an attachment end, said outboard end including a first jaw member for engaging said steering wheel and a centrally located slot, said first jaw member including a receptacle;

a mating member having an outboard end and an attachment end carried in said slot and having a jaw member at its outboard end cooperating with said first jaw member, said first jaw member and said mating jaw member being pivotally connected at said attachment end to permit said jaw members to open and close around said steering wheel, said mating jaw member including a longitudinal bore;

latch means including a generally cylindrical lock mechanism carried in said bore of said mating jaw member including a bolt and cooperating with said first jaw member to hold said jaw members closed, and means moving said bolt into and out of said receptacle for engaging and disengaging said latch means;

anchor means secured to the body of the vehicle; and an armored flexible cable secured at one end to said anchor means and at the other end to said lock mechanism within said bore.

2. Locking device as claimed in claim 1 wherein said latch means includes electro-responsive means operatively connected to said first jaw member and said mating member for opening said jaw members, electrical wires connected between said electro-responsive means and said anchor means and extending through said cable; and switch means connected to said wires for causing said electro-responsive means to release said jaws members.

3. Locking device as claimed in claim 2 wherein said electro-responsive means is a solenoid.

4. A locking device as claimed in claim 1 wherein said means moving said bolt is a key-operated lock mechanism.

5. A locking device as claimed in claim 1 wherein said first jaw member includes a notch receiving the outboard end of said mating member.

* * * * *